(12) United States Patent
Boon (10) Patent No.: US 12,355,337 B2
(45) Date of Patent: Jul. 8, 2025

(54) SYSTEMS AND METHODS FOR COOLING ELECTRIC MOTOR

(71) Applicant: Dana Belgium N.V., Flanders (BE)

(72) Inventor: Fabrice Boon, Hertsberge (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/334,902

(22) Filed: Jun. 14, 2023

(65) Prior Publication Data
US 2023/0327521 A1  Oct. 12, 2023

Related U.S. Application Data

(62) Division of application No. 17/148,469, filed on Jan. 13, 2021, now Pat. No. 11,722,038.

(51) Int. Cl.
| | | |
|---|---|---|
| H02K 9/193 | (2006.01) | |
| H02K 5/20 | (2006.01) | |
| H02K 7/116 | (2006.01) | |

(52) U.S. Cl.
CPC ............ H02K 9/193 (2013.01); H02K 5/203 (2021.01); H02K 7/116 (2013.01)

(58) Field of Classification Search
CPC ........ H02K 9/193; H02K 5/203; H02K 7/116; H02K 1/32; H02K 9/19
See application file for complete search history.

(56) References Cited

U.S. PATENT DOCUMENTS

| | | | |
|---|---|---|---|
| 6,617,715 B1 | 9/2003 | Harris et al. | |
| 6,833,641 B2 | 12/2004 | Uchida et al. | |
| 7,156,195 B2 | 1/2007 | Yamagishi et al. | |
| 7,378,766 B2 | 5/2008 | Vasilescu et al. | |
| 8,384,255 B2 | 2/2013 | Ohashi et al. | |
| 8,427,019 B2 | 4/2013 | Garriga et al. | |
| 8,672,646 B2 | 3/2014 | Ishizono et al. | |

(Continued)

FOREIGN PATENT DOCUMENTS

| | | |
|---|---|---|
| CN | 1913287 A | 2/2007 |
| CN | 107795493 A | 3/2018 |

(Continued)

OTHER PUBLICATIONS

WO2020179219A1 English translation (Year: 2024).*

*Primary Examiner* — Christopher M Koehler
*Assistant Examiner* — Viswanathan Subramanian
(74) *Attorney, Agent, or Firm* — McCoy Russell LLP (57) ABSTRACT

Systems and methods are provided for cooling an electric motor, the electric motor being fluidically coupled to a coolant sump of a gearbox. In one example, a system may include the gearbox including the coolant sump, the electric motor coupled to the gearbox, an outer shaft fluidic ally coupling the electric motor to the coolant sump, an inner shaft extending through each of the coolant sump and the outer shaft, and one or more surface features disposed along a portion of the inner shaft extending within the outer shaft. Upon rotation of the inner shaft during operation of the electric motor, a coolant in the coolant sump may be drawn through the outer shaft from the coolant sump into the electric motor. In this way, the coolant may be passively directed to the electric motor with minimal cost, packaging size, and system complexity and without significant losses in overall system efficiency.

17 Claims, 4 Drawing Sheets

(56) References Cited

U.S. PATENT DOCUMENTS

| | | |
|---|---|---|
| 8,928,195 B2 | 1/2015 | Ohashi et al. |
| 8,988,881 B2 | 3/2015 | Koplow |
| 9,272,636 B2 | 3/2016 | Ichikawa |
| 9,331,552 B2 | 5/2016 | Fedoseyev et al. |
| 9,729,027 B2 | 8/2017 | Miyamoto et al. |
| 9,787,164 B2 | 10/2017 | Büttner et al. |
| 10,480,511 B2 | 11/2019 | Desiron |
| 2003/0066638 A1 | 4/2003 | Ou et al. |
| 2006/0140791 A1 | 6/2006 | Deming et al. |
| 2007/0169583 A1 | 7/2007 | Reis et al. |
| 2008/0272661 A1 | 11/2008 | Zhou et al. |
| 2014/0125165 A1* | 5/2014 | Miyamoto ............... H02K 9/19 310/54 |
| 2016/0059949 A1 | 3/2016 | Rebele et al. |
| 2017/0346371 A1* | 11/2017 | Gruetzner ............. H02K 9/197 |
| 2019/0305643 A1* | 10/2019 | Huber ................... H02K 9/193 |

FOREIGN PATENT DOCUMENTS

| | | |
|---|---|---|
| EP | 2444265 B1 | 6/2013 |
| WO | 2020179219 A1 | 9/2020 |

* cited by examiner

SYSTEMS AND METHODS FOR COOLING ELECTRIC MOTOR

CROSS REFERENCE TO RELATED APPLICATION

The present application is a divisional of U.S. Non-Provisional patent application Ser. No. 17/148,469, entitled "SYSTEMS AND METHODS FOR COOLING ELECTRIC MOTOR", and filed on Jan. 13, 2021. The entire contents of the above-listed application are hereby incorporated by reference for all purposes.

TECHNICAL FIELD

The present description relates generally to systems and methods for cooling electric motors, and particularly for cooling an electric motor fluidically coupled to a gearbox.

BACKGROUND AND SUMMARY

An electric motor may include heat sinks or other components configured to maintain an operating temperature of the electric motor within a desirable range. In some examples, the electric motor may be configured to receive a coolant, where heat produced by the electric motor may be transferred from the electric motor to the coolant to reduce the operating temperature. In such examples, the coolant may be delivered across various surfaces of the electric motor (e.g., surfaces which are commonly subjected to relatively high heat during electric motor operation) such that excess heat may be absorbed from the various surfaces.

In examples wherein the electric motor is fluidically coupled to a gearbox (e.g., to reduce packaging size and cost in an electric or hybrid electric vehicle), the coolant may desirably be shared between the electric motor and the gearbox. In one example, during electric motor operation, a fixed, passive coolant transport system (e.g., one or more baffles, channels, etc.) may be employed to deliver the coolant from the gearbox to the electric motor. However, the fixed, passive coolant transport system alone may be unable to efficiently deliver the coolant to the various surfaces of the electric motor which may benefit from cooling during electric motor operation (such as surfaces on an opposite end of the electric motor from the gearbox). Another option, alone or in combination with the fixed, passive coolant transport system, may include implementing an active coolant pump. However, such pumps may result in increased packaging space, complexity, maintenance, and cost.

In one example, the issues described above may be addressed by a system including a gearbox comprising a first sump, an electric motor fluidically coupled to the gearbox, an outer shaft extending through the electric motor and into the first sump, the first sump being fluidically coupled to the electric motor via the outer shaft, an inner shaft coaxial with the outer shaft, the inner shaft extending through each of the first sump and the outer shaft, and an external screw thread disposed along a portion of the inner shaft extending within the outer shaft. Upon rotation of the inner shaft, a coolant in the first sump may be drawn through the outer shaft from the first sump into the electric motor. Specifically, rotation of the external screw thread may induce flow of the coolant along the outer shaft. In some examples, rotation of the inner shaft may be responsive to operation of the electric motor, such that the coolant may flow to the electric motor whenever the electric motor is operated. In some examples, a plurality of openings or outlets may be provided on a portion of the outer shaft extending within the electric motor. Accordingly, the coolant may be distributed substantially evenly throughout the electric motor, or the coolant may be directed to surfaces specifically prone to excess heat.

In some examples, the electric motor may include one or more channels or grooves set in an internal surface of a housing of the electric motor, the one or more channels or grooves configured to direct the coolant back to a second sump of the gearbox. During operation of the electric motor, rotation of the inner shaft may rotate at least one gear partially submersed in the coolant collected in the second sump. As a result, the coolant may be splashed against a housing of the gearbox, wherefrom the splashed coolant may be directed back into the first sump (e.g., via one or more baffles or vanes affixed to the housing of the gearbox). In this way, during operation of the electric motor, the coolant may be passively cycled between the gearbox and the electric motor without significant increases in packaging space, complexity, maintenance, and cost, or significant losses in overall system efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for cooling an electric motor fluidically coupled to a gearbox by passively (e.g., without actively controlling) cycling a coolant between the electric motor and the gearbox. Specifically, a coolant pump may extend between the electric motor and the gearbox, the coolant pump being formed from an outer shaft enclosing at least a portion of an inner shaft. The inner shaft may include one or more surface features configured such that, during rotation of the inner shaft, the coolant may be drawn from a shaft sump in the gearbox to an internal volume of the electric motor. For example, the coolant pump may be a screw pump or an axial-flow pump, the one or more surface features being respectively configured as an external helical threading or a propeller, and the outer shaft providing a pump housing. The inner shaft may rotate during operation of the electric motor, such that the coolant may be directed along the outer shaft from the gearbox to the electric motor. A plurality of openings or outlets in the outer shaft may be configured to distribute the coolant to desirable locations within the electric motor, such as end windings of a stator of the electric motor.

Following distribution of the coolant within the electric motor, the coolant may be directed back into the gearbox via gravity drainage. For example, the coolant may collect in one or more channels or grooves set into one or more internal surfaces of the electric motor, the one or more channels or grooves being fluidically coupled to a gearbox sump, e.g., integrally formed within the gearbox, and configured to direct the coolant thereto. From the gearbox sump, the coolant may be directed back into the shaft sump via splashing of the coolant, thus completing passive cycling of the coolant. For example, at least one gear extending into the gearbox sump may be fixedly coupled to the inner shaft, such that rotation of the inner shaft during operation of the electric motor may splash the coolant against an internal surface of the gearbox. In some examples, one or more baffles or vanes may be provided at the internal surface of the gearbox to collect the splashed coolant and direct the splashed coolant into the shaft sump. In this way, a coolant pump may be provided which passively cycles and distributes coolant throughout an electric motor and a gearbox fluidically coupled thereto while substantially maintaining an overall system efficiency and mitigating increases in packaging size, complexity, maintenance, and cost ("substantially" may be used herein as a qualifier meaning "effectively" or "practically").

Figure 1:
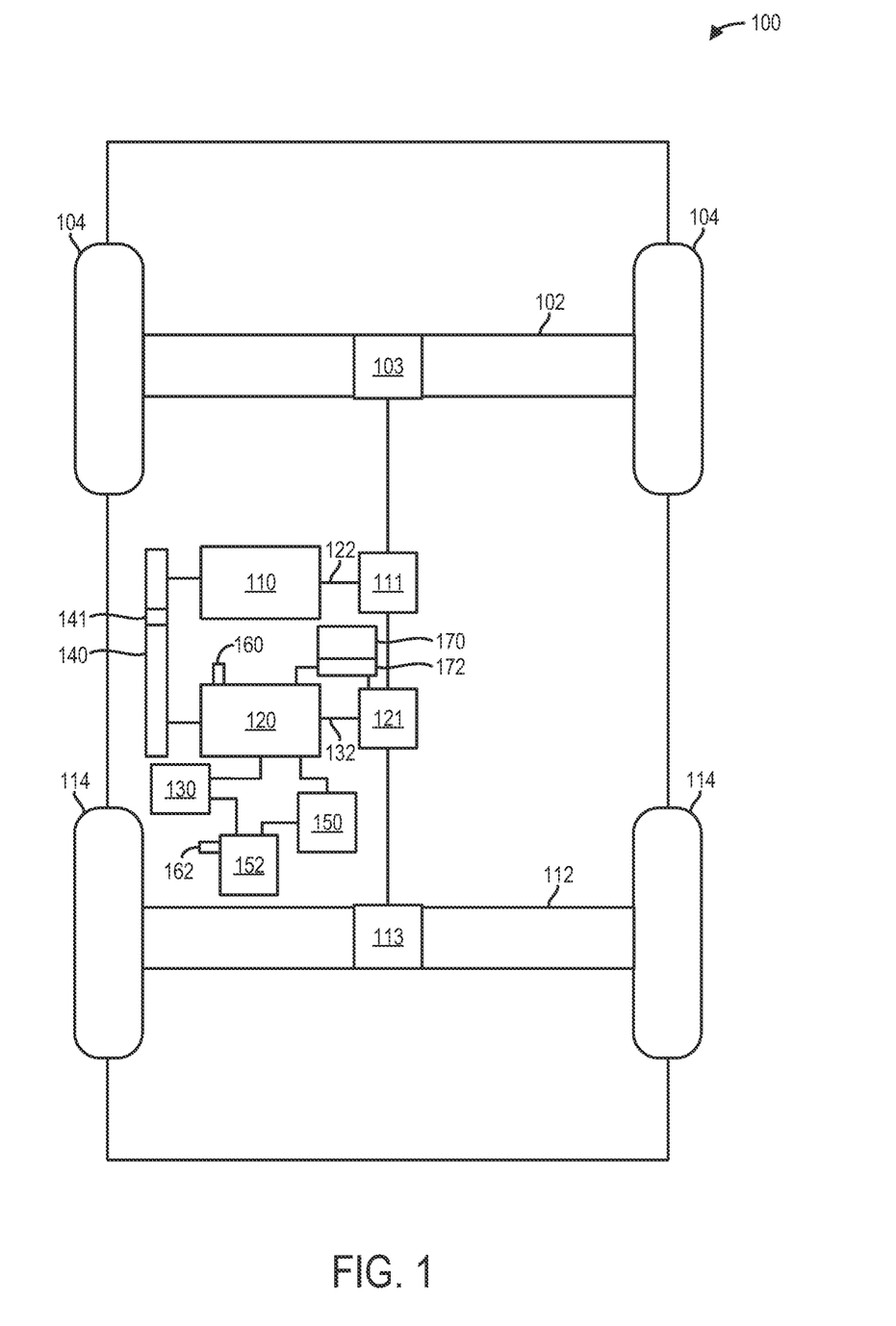
FIG. 1 schematically shows an exemplary vehicle including an electric motor.
Figure 2:
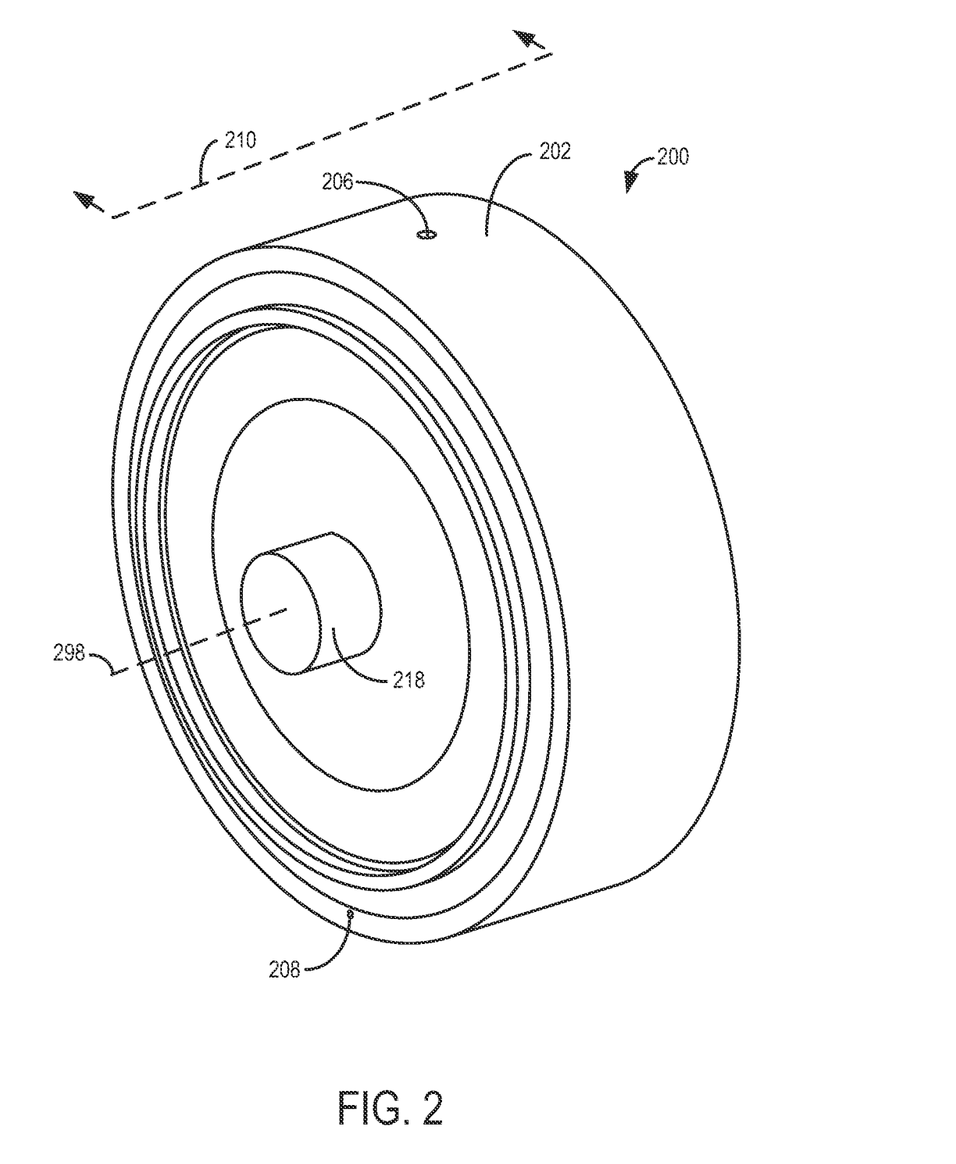
FIG. 2 shows a perspective view of an electric motor, such as the electric motor of FIG. 1.

In an exemplary embodiment, an electric or hybrid-electric vehicle, such as the vehicle of FIG. 1, may include an electric motor, such as the electric motor of FIG. 2, fluidically coupled to a gearbox. A passive cooling system, such as the passive cooling system of FIG. 3, may be included within the electric motor and the gearbox, the passive cooling system configured to distribute a coolant throughout internal volumes of the electric motor and the gearbox. An exemplary method for passively cooling the electric motor via the passive cooling system is depicted at FIG. 4.

Referring to FIG. 1, a vehicle 100 is shown schematically. The vehicle 100 may include a first shaft 102 and a second shaft 112. The first shaft 102 may be configured to drive a first set of wheels 104 of the vehicle 100 and the second shaft 112 may be configured to drive a second set of wheels 114 of the vehicle 100. In one example, the first shaft 102 may be arranged nearer to a front of the vehicle 100 than the second shaft 112 such that the second shaft 112 is arranged nearer to a rear of the vehicle 100 than the first shaft 102.

The vehicle 100 may include an engine 110 coupled to a first gearbox 111 via a third shaft 122 (e.g., a first output shaft 122). In some examples, the vehicle 100 may further include an electric motor 120 coupled to a second gearbox 121 via a fourth shaft 132 (e.g., a second output shaft 132). Each of the first gearbox 111 and the second gearbox 121 may transfer power to a first differential 103 arranged on the first shaft 102 and a second differential 113 arranged on the second shaft 112. Accordingly, in one example, the vehicle 100 may include a coaxial motor-gearbox configuration, wherein the second gearbox 121 includes an internal differential (not shown at FIG. 1) having at least one output shaft (e.g., the fourth shaft 132) extending therefrom through the electric motor 120 and a side of the second gearbox 121 opposite the electric motor 120, the at least one output shaft coupling output of the electric motor 120 to the first and second sets of wheels 104, 114 via the first and second shafts 102, 112, respectively.

In one example, the engine 110 and the electric motor 120 may be arranged in a power-series hybrid configuration. However, it will be appreciated by those of ordinary skill in the art that the hybrid configuration of the vehicle 100 may be in any form without departing from the scope of the present disclosure. As one example, the vehicle 100 may be adjustable to a plurality of different modes. In one example mode, the vehicle 100 may be propelled via torque provided to the wheels (e.g., the first set of wheels 104 and the second set of wheels 114) by only the engine 110. In another example mode (e.g., an all-electric mode of a hybrid configuration) or another example configuration (e.g., an all-electric configuration), the vehicle 100 may be propelled via torque provided to the wheels (e.g., the first set of wheels 104 and the second set of wheels 114) by only the electric motor 120. In yet another example, the vehicle 100 may be propelled via torque provided to the wheels (e.g., the first set of wheels 104 and the second set of wheels 114) by both of the engine 110 and the electric motor 120. In some examples, both of the engine 110 and the electric motor 120 may be coupled to the first gearbox 111 and/or the second gearbox 121.

The electric motor 120 may be configured to receive energy (e.g., electrical energy) from a power source 130. The power source 130 may be a battery or a battery pack, as one example. In some examples, each of the engine 110 and the electric motor 120 may be fluidically coupled to a common cooling system 140. In additional or alternative examples, each of the electric motor 120 and the second gearbox 121 may be fluidically coupled to a common cooling system 170 (such as the passive cooling system described in detail below with reference to FIG. 3).

The cooling system 140 and/or the cooling system 170 may include a cooling media, such as air, water, glycol, oil, a phase change material, a conductive solid, or the like. In examples wherein the cooling media includes a cooling fluid or coolant, the cooling system 140 may flow the coolant through coolant passages of the engine 110 and the electric motor 120 and/or the cooling system 170 may flow the coolant through coolant passages of the electric motor and the second gearbox 121. In some examples, one or both of the engine 110 and the electric motor 120 may be fluidly coupled to separate cooling systems. For example, the electric motor 120 may be fluidically coupled to a dedicated electric motor cooling system, such as the cooling system 170 including a passive coolant pump 172 (e.g., a coolant pump not actively controlled during vehicle operation) and a plurality of coolant flow paths, where the plurality of coolant flow paths may be configured to receive the coolant (e.g., oil) flowing from a coolant outlet of the electric motor 120 and flow the coolant to a coolant inlet of the electric motor 120 via the passive coolant pump 172 (e.g., after cycling the coolant through the second gearbox 121).

As described above, the vehicle 100 may include the electric motor 120 configured to deliver torque to the wheels of the vehicle 100 to propel the vehicle 100. In some examples, the vehicle 100 may further include the electric motor 152 configured to provide torque to power one or more other devices onboard the vehicle 100. For example, the electric motor 152 may be configured to power (e.g., deliver torque to) a cooling fan, compressor, or other device of the vehicle 100. As shown, and similar to the electric motor 120, the electric motor 152 may be configured to receive energy (e.g., electrical energy) from the power source 130. The electric motor 152 and the electric motor 120 may further be configured to receive the coolant (e.g., oil) from a same cooling system, in some examples (e.g., the cooling system 140 or the cooling system 170).

The vehicle 100 may additionally include an electronic controller 150. The controller 150 may receive signals (e.g., input) from the various sensors of FIG. 1 and employs the various actuators of FIG. 1 to adjust engine operation based on the received signals and instructions stored on non-transitory memory of the controller 150. As non-limiting examples, the sensors of the vehicle 100 may include various temperature sensors (e.g., a temperature sensor 160 configured to measure a temperature of the electric motor 120, a temperature sensor 162 configured to measure a temperature of the electric motor 152, etc.), pressure sensors, speed sensors, throttle sensors, battery charge sensors, air-fuel ratio sensors, etc. As non-limiting examples, the actuators of the vehicle 100 may include various valves, throttles, fuel injectors, etc. The types of sensors and actuators listed herein are for illustrative purposes and any type of sensors and/or actuators may be included without departing from the scope of this disclosure.

Based on received input from the sensors, the controller 150 may send control signals to the actuators, the actuators being communicably coupled to the electric motor 120, the electric motor 152, the engine 110, and/or other components of the vehicle 100. For example, adjusting an amount of coolant flowing to the electric motor 120 and/or the electric motor 152 may include adjusting an amount of energization and/or energization timing of a coolant pump (e.g., a coolant pump 141 included in the cooling system 140) configured to pump the coolant to the electric motor 120 and/or the electric motor 152 based on received input from the temperature sensor 160 and/or the temperature sensor 162, respectively (however, it will be appreciated that other embodiments herein may include no actively controlled coolant pump in either the cooling system 140 or the cooling system 170).

The controller 150 may be a microcomputer electrically coupled to the power source 130, the microcomputer including a microprocessor unit, input/output ports, and an electronic storage medium for executable programs and calibration values. The controller 150 may include a non-transitory computer readable medium (memory) in which programming instructions are stored, and may be programmed with computer readable data representing instructions executable to perform various methods, such as the method described in detail below with reference to FIG. 4, as well as other variants that are anticipated but not specifically listed. Memory as referenced herein may include volatile and non-volatile or removable and non-removable media for storage of electronic-formatted information such as computer readable instructions or modules of computer readable instructions, data, etc. Examples of memory may include, but are not limited to, random-access memory (RAM), read-only memory (ROM), electrically erasable programmable ROM (EEPROM), flash memory, or any other medium which may be used to store a desired electronic format of information and which may be accessed by a processor or processors or at least a portion of a computing device (e.g., the controller 150 or an external computing device).

Referring now to FIG. 2, a perspective view of an electric motor 200 is shown. In some examples, the electric motor 200 may be similar to, or the same as, the electric motor 120 or the electric motor 152 as described in detail above with reference to FIG. 1. For example, the electric motor 200 may be configured to provide torque to one or more wheels of a vehicle, such as the vehicle 100 as described in detail above with reference to FIG. 1. As another example, the electric motor 200 may be configured to drive one or more devices of the vehicle, such as one or more fans, compressors, etc. (e.g., similar to the electric motor 152 described above).

The electric motor 200 may include a housing 202. In some examples, the housing 202 may be physically coupled to the electric motor 200 via welds, fusions, adhesives, fasteners, or other similar coupling elements. The housing 202 may house a plurality of components of the electric motor 200. For example, the electric motor 200 may include a rotor, a stator, windings, and the like disposed within the housing 202. Energization of the electric motor 200 may include energizing the rotor and the stator via a power source coupled to the electric motor 200 (e.g., the power source 130 as described in detail above with reference to FIG. 1). During conditions in which the electric motor 200 is energized, an output shaft 218 (e.g., similar to, or the same as, the fourth shaft 132 as described in detail above with reference to FIG. 1) may be driven to rotate around a central axis 298 of the electric motor 200 by an electromechanical coupling between the rotor and the stator (e.g., to provide torque to wheels of the vehicle, drive one or more vehicle devices, etc.). In some examples, the electric motor 200 may include a coolant jacket arranged between the stator and the housing 202, the coolant jacket ensheathing the stator. In other examples, the electric motor 200 may include no coolant jacket therein.

In some examples, the housing 202 may include a coolant inlet 206 and a coolant outlet 208. A coolant (e.g., oil) may flow into an internal volume of the electric motor 200 via the coolant inlet 206, and the coolant may flow out of the electric motor 200 via the coolant outlet 208. In some examples, the coolant inlet 206 and the coolant outlet 208 may instead be fluidically coupled to the coolant jacket ensheathing the stator. In one example, the coolant inlet 206 and coolant outlet 208 may be arranged at opposing ends of the housing 202. One such configuration of the coolant inlet 206 and the coolant outlet 208 is shown (however, it will be appreciated that other configurations, such as arranging the coolant inlet 206 and the coolant outlet 208 on opposite ends of the same radial outer surface of the housing 202, are within the scope of the present disclosure). In another example, and as described in detail below with reference to FIG. 3, the coolant may enter the housing 202 via a flow path included within the output shaft 218, from which the coolant may flow into the internal volume of the electric motor 200 via a plurality of openings or outlets disposed in the output shaft 218 within the housing 202 (for reference, an exemplary cutline 210 is shown to contextualize the electric motor 200 within the schematic cross-sectional view of FIG. 3).

Figure 3:
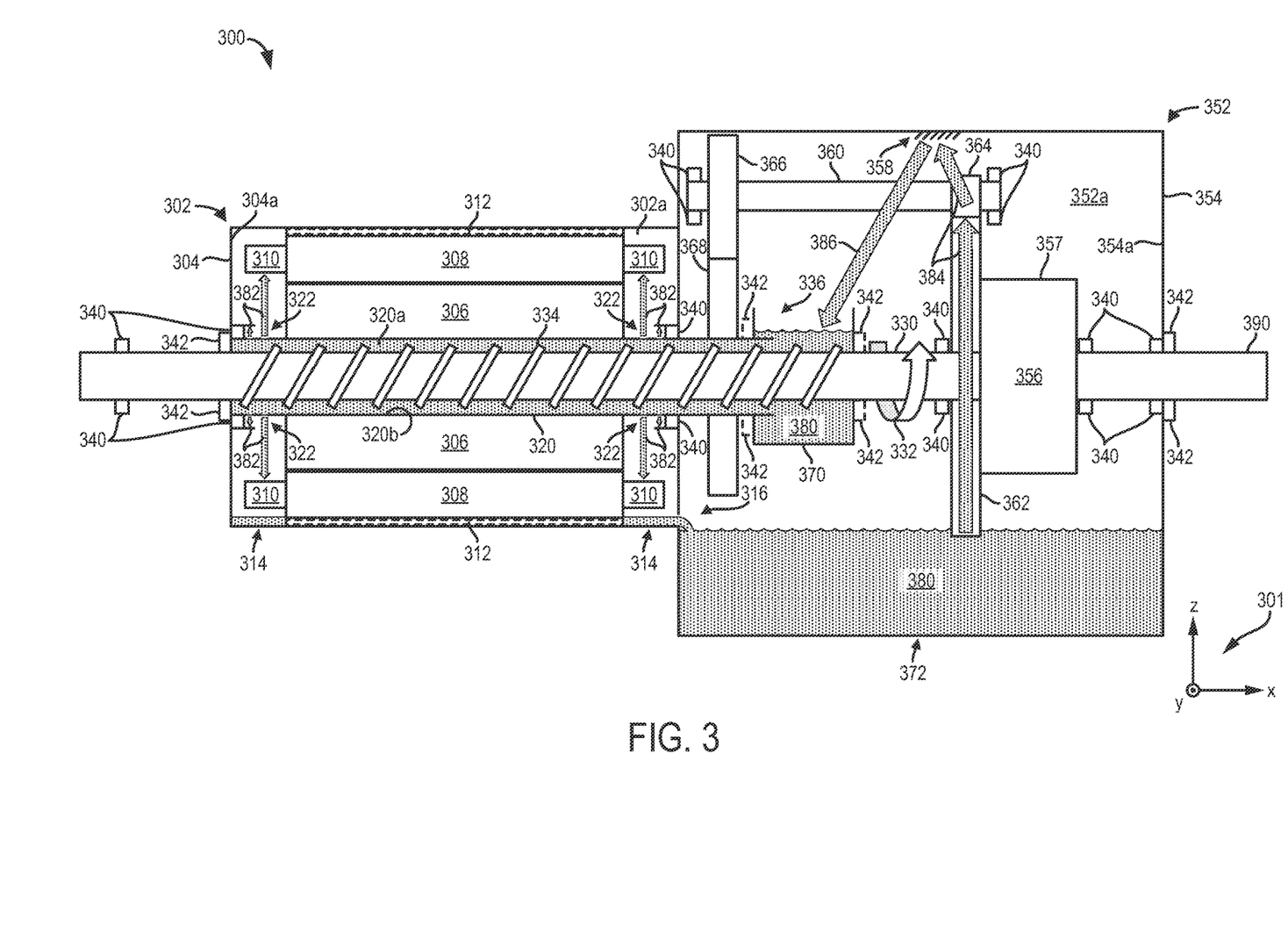
FIG. 3 shows a schematic cross-sectional view of a passive cooling system for an electric motor, such as the electric motor of FIG. 1 or 2, fluidically coupled to a gearbox.
Figure 4:
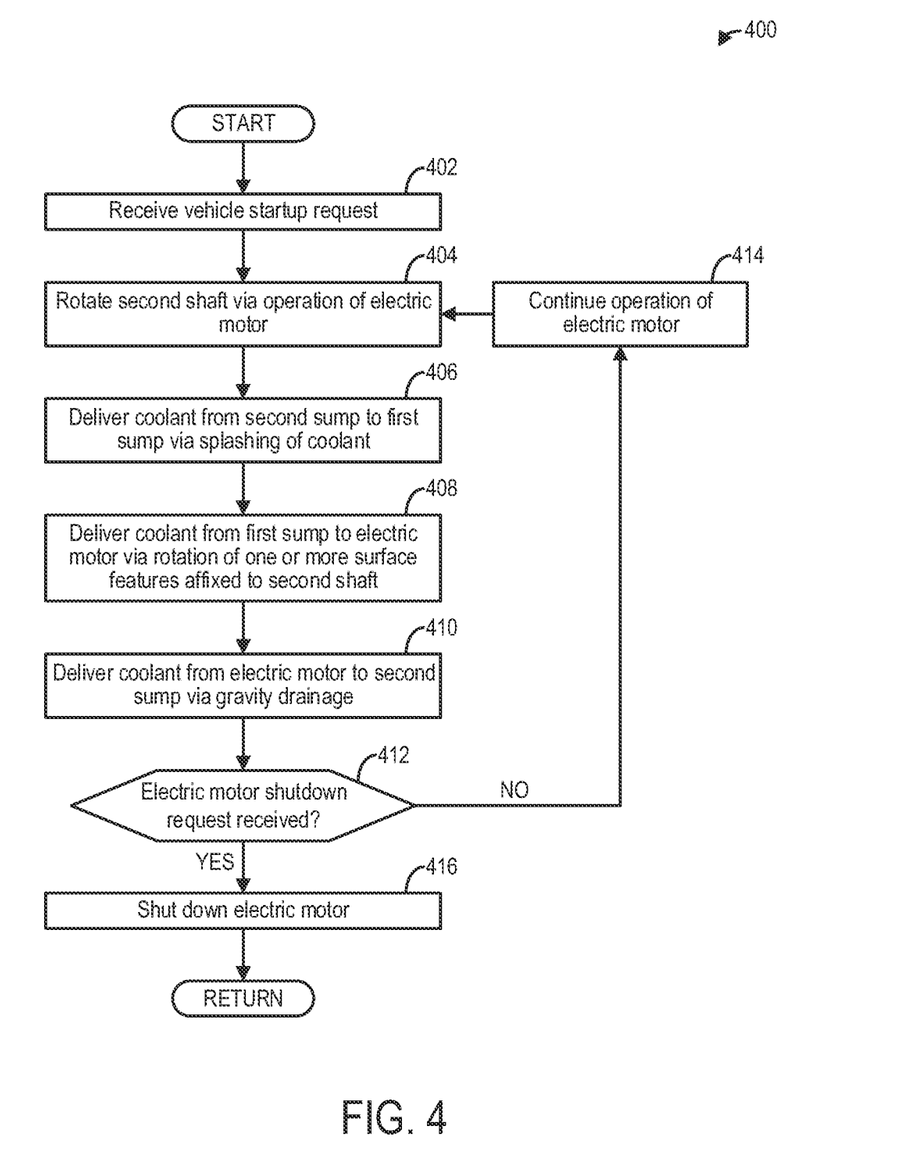
FIG. 4 shows a flow chart illustrating a method for passively cooling an electric motor fluidically coupled to a gearbox.

Referring now to FIG. 3, a schematic cross-sectional view depicting a passive cooling system 300 for an electric motor 302 fluidically coupled to a gearbox 352 is shown. In some examples, the gearbox 352 may be similar to, or the same as, the second gearbox 121 as described in detail above with reference to FIG. 1. Similarly, in some examples, the electric motor 302 may be similar to, or the same as, the electric motor 120 or the electric motor 152 as described in detail above with reference to FIG. 1. In other examples, the electric motor 302 may be similar to, or the same as, the electric motor 200 as described in detail above with reference to FIG. 2. For example, the schematic cross-sectional view may be taken along the cutline 210 of FIG. 2. It will be appreciated, however, that the electric motor 302 of FIG. 3 may not match the relative dimensions and proportions of the electric motor of FIG. 2. A set of reference axes 301 is provided for describing relative positioning of the components shown, the axes 301 indicating an x-axis, a y-axis, and a z-axis. In one example, the z-axis may be parallel with a direction of gravity (e.g., in a negative direction along the z-axis) and a vertical direction (e.g., in a positive direction along the z-axis).

The electric motor 302 may include a housing 304 defining an internal volume or interior 302a of the electric motor 302. Various components of the electric motor 302 may be disposed within the internal volume 302a (e.g., enclosed or housed within the housing 304). For example, a rotor 306 ensheathed by a stator 308 including a plurality of end windings 310 may be positioned within the housing 304 such that an axis of rotation of the rotor 306 is coaxial with a central axis of the electric motor 302 along the x-axis. In some examples, the electric motor 302 may include a cooling jacket 312 arranged between the housing 304 and the stator 308, such that the stator 308 may be ensheathed by the cooling jacket 312. In one example, and as discussed below, the cooling jacket 312 may supplant or supplement the passive cooling system 300 during select operation of the electric motor 302. In another example, however, the electric motor 302 may include no cooling jacket therein.

The gearbox 352 may include a housing 354 defining an internal volume or interior 352a of the gearbox 352. Various components of the gearbox 352 may be disposed within the internal volume 352a (e.g., enclosed or housed within the housing 354). For example, a differential 356 and a plurality of gears (including gears 362, 364, 366, and 368) may be positioned within the housing 354, the differential 356 and each of the plurality of gears being independently coupled to at least one rotating shaft and configured to deliver torque from the electric motor 302 to one or more outputs (e.g., wheels of a vehicle). In one example, the differential 356 may be configured to independently rotate a port shaft 330 (also referred to herein as an inner shaft 330, as discussed below) and a starboard shaft 390 to deliver outputs along a negative direction of the x-axis and a positive direction of the x-axis, respectively.

Each of a shaft sump 370 and a gearbox sump 372 may further be disposed within the housing 354, each of the shaft sump 370 and the gearbox sump 372 including at least some of a coolant 380 during operation of the electric motor 302. Each of the shaft sump 370 and the gearbox sump 372 may be entirely enclosed within the housing 354 of the gearbox 352 and entirely external to the housing 304 of the electric motor 302. In some examples, the shaft sump 370 may be open and positioned above the gearbox sump 372 along the z-axis such that, when the shaft sump 370 is overfilled, the coolant 380 may spill over from the shaft sump 370 into the gearbox sump 372. In some examples, and as shown, the gearbox sump 372 may be positioned below the shaft sump 370 and integrally formed with the housing 354.

The electric motor 302 may be fluidically coupled to the gearbox 352 at least via an internal volume or interior 320a of an outer shaft 320 extending through the electric motor 302 and into the gearbox 352. Specifically, the outer shaft 320 may extend from the electric motor 302 and through the shaft sump 370, such that the shaft sump 370 may be fluidically coupled to the electric motor 302 via the outer shaft 320. Accordingly, the outer shaft 320 may be at least partially enclosed within each of the housing 304 of the electric motor 302 and the housing 354 of the gearbox 352.

The outer shaft 320 may be fixedly coupled to the rotor 306, such that rotation of the rotor 306 during operation of the electric motor 302 may rotate the outer shaft 320 therewith. Respective seals 342 may be provided at interfaces of the outer shaft 320 with the housing 304 and the shaft sump 370 so as to prevent leakage of the coolant 380 thereat. However, in some examples, such as when the shaft sump 370 continuously receives an amount of the coolant 380 equal to or greater than an amount of the coolant 380 lost during operation of the electric motor 302, no seal may be provided at the interface of the outer shaft 320 with the shaft sump 370 such that the coolant 380 may leak therethrough and flow to the gearbox sump 372.

The inner shaft 330 may be coaxial with and disposed within the outer shaft 320, the inner shaft 330 extending through each of the outer shaft 320 and the shaft sump 370. Similar to the outer shaft 320, respective seals 342 may be provided at interfaces of the inner shaft 330 with the housing 304, the shaft sump 370, and the housing 354 so as to prevent leakage of the coolant 380 or lubricant thereat. However, in some examples, such as when the shaft sump 370 continuously receives an amount of the coolant 380 equal to or greater than an amount of the coolant 380 lost during operation of the electric motor 302, no seal may be provided at the interface of the inner shaft 330 with the shaft sump 370 such that the coolant 380 may leak therethrough and flow to the gearbox sump 372. In some examples, and as shown, the seal 342 provided at the interface of the inner shaft 330 with the housing 304 may be the same seal 342 provided at the interface of the outer shaft 320 with the housing 304.

Rotation of the outer shaft 320 may drive rotation of the inner shaft 330 via rotation of the plurality of gears and at least one lay shaft 360 (e.g., a single lay shaft 360, as shown at FIG. 3, or a plurality of lay shafts 360, such as in a multi-stage gearbox). Specifically, and as shown at FIG. 3, the outer shaft 320 may rotate the gear 368 via a fixed coupling therewith, the gear 368 meshingly engaging the gear 366. The (rotating) gear 366 may be fixedly coupled to the lay shaft 360 at one end thereof, such that the gear 364, being fixedly coupled to the lay shaft 360 at an opposite end, may be rotated. The (rotating) gear 364 may meshingly engage the gear 362, which may be a ring gear of the differential 356 fixedly coupled to a housing 357 thereof. Upon engagement of the housing 357 of the differential 356 via the (rotating) gear 362, the differential 356 may drive independent rotation of the inner (port) shaft 330 and the starboard shaft 390 via a differential mechanism. In this way, the rotation of the plurality of gears may be coupled to the rotation of the inner shaft 330. A direction of rotation of each of the rotor 306, the outer shaft 320, and the inner shaft 330 during forward operation of the electric motor 302 is indicated by an arrow 332. As shown, a plurality of bearings 340 may be coupled at various locations within and without the electric motor 302 and the gearbox 352 to the outer shaft 320, the inner shaft 330, the lay shaft 360, and the starboard shaft 390 to facilitate respective rotations thereof. Additionally or alternatively, a disconnect mechanism may be provided at the differential 356 such that the inner shaft 330 may be reversibly decoupled from rotation of the rotor 306 and the outer shaft 320 during select modes of operation (e.g., when relatively rapid warmup of components of the electric motor 302 is desired).

One or more surface features 334 may be affixed to the inner shaft 330, the one or more surface features 334 disposed at least along a portion of the inner shaft 330 extending within the outer shaft 320. In some examples, and as shown, the one or more surface features 334 may be configured as an external helical threading pattern (e.g., an external screw thread) extending from the inner shaft 330. It will be apparent that the one or more surface features 334 as shown in FIG. 3 have not been cut to illustrate the exemplary configuration of the external helical threading pattern. In other examples, the one or more surface features 334 may be configured as a propeller extending from the inner shaft 330. The one or more surface features 334 may be clearance fit to an inner or internal surface 320b of the outer shaft 320 such that rotation of the inner shaft 330 may draw the coolant 380 through the outer shaft 320 from the shaft sump 370 to the electric motor 302 via the one or more surface features 334. In certain examples, the coolant 380 may only be drawn into the electric motor 302 via rotation of the inner shaft 330 (e.g., flow of the coolant 380 along the outer shaft 320 from the shaft sump 370 to the internal volume 302a within the housing 304 may be induced only based on rotation of the inner shaft 330). In some examples, the outer shaft 320 may rotate independently from or concurrently with the inner shaft 330, so as to substantially evenly distribute the coolant 380 on one or more surfaces (e.g., on each of the plurality of end windings 310) within the internal volume 302a of the electric motor 302 via one or more openings or outlets 322 disposed on the outer shaft 320 (as described in detail below). In this way, the outer shaft 320 and the inner shaft 330 may be configured as a passive coolant pump 336, the outer shaft 320 providing a pump housing and the one or more surface features 334 inducing a flow of the coolant 380 from the gearbox 352 to the electric motor 302. Accordingly, in examples wherein the one or more surface features 334 is configured as the external helical threading pattern, the passive coolant pump 336 may be correspondingly configured as a screw pump, and in examples wherein the one or more surface features 334 is configured as the propeller, the passive coolant pump 336 may be correspondingly configured as an axial-flow pump.

Because rotation of the outer shaft 320 and the inner shaft 330 are coupled, reverse operation of the electric motor 302 may result in the coolant 380 being siphoned from the electric motor 302 and back into the shaft sump 370 (e.g., via reversed rotation of the one or more surface features 334). Accordingly, the systems and methods described by embodiments of the present disclosure may not be readily apparent to those of ordinary skill in the art at least because less cooling may be provided to the electric motor 302 by the passive cooling system 300 during reverse operation of the electric motor 302. However, as performance may be more limited during reverse operation of the electric motor 302 than during forward operation of the electric motor 302, degradation to components of the electric motor 302 during reverse operation thereof may be substantially avoided even with less cooling. Nonetheless, in some examples, the cooling jacket 312 may be included in the electric motor 302 to supplant the passive cooling system 300 during reverse operation. Additionally or alternatively, the cooling jacket 312 may be included in the electric motor 302 to supplement the passive cooling system 300 during forward operation.

The one or more openings or outlets 322 may be disposed on a portion of the outer shaft 320 enclosed within the housing 304. Accordingly, upon rotation of the inner shaft 330, the coolant 380 may enter the housing 304 via the one or more openings 322 (as indicated by arrows 382). In some examples, a relative location of the one or more openings 322 may be selected based on a configuration or application of the electric motor 302. As an example, the one or more openings 322 may be positioned to direct the coolant 380 to specific surfaces within the internal volume 302a of the electric motor 302. For instance, the one or more openings 322 may be axially positioned beneath respective end windings 310 along the z-axis, such that the coolant 380 may be supplied to lubricate and/or cool surfaces of the plurality of end windings 310. Additionally or alternatively, the one or more openings 322 may be positioned adjacent to respective bearings 340 within the internal volume 302a of the electric motor 302, such that the coolant 380 may be supplied to lubricate and/or cool surfaces of such bearings. As another example, the one or more openings 322 may be positioned to distribute the coolant 380 substantially evenly throughout the internal volume 302a of the electric motor 302.

The flow of the coolant 380 may be controlled via judicious selection of a plurality of design parameters during manufacture of the passive cooling system 300. Specifically, a rotational speed of the outer shaft 320 and a rotational speed of the inner shaft 330 may be a function of the plurality of design parameters. In non-limiting examples, the plurality of design parameters may include a configuration (e.g., overall shape) of the one or more surface features 334 (e.g., as the external helical threading pattern, the propeller, etc.), dimensions (e.g., width along the x-axis or height along the y-axis or the z-axis) of the one or more surface features 334, a number of the one or more surface features 334, an angle of the one or more surface features 334 with respect to the inner shaft 330, a tolerance of the clearance fit of the one or more surface features 334 with the outer shaft 320, an overall shape of each of the one or more openings 322, the relative location of the one or more openings 322, a number of the one or more openings 322, and an angle of the one or more openings 322 with respect to the outer shaft 320. For example, the overall shape of the one or more openings 322 may be circular, elliptical, square, rectangular, diamond-shaped, substantially annular, etc.

After the coolant 380 is drawn into the electric motor 302 via the passive coolant pump 336, the coolant 380 may collect in one or more channels or grooves 314 set into an inner or internal surface 304a (e.g., of the housing 304) of the electric motor 302. The one or more channels 314 may be configured to drain (e.g., via gravity drainage, induced or gravity-assisted drainage, etc.) the collected coolant 380 into the gearbox sump 372 through an opening 316 fluidically coupling the electric motor 302 to the gearbox sump 372.

At least one gear of the plurality of gears may extend into the gearbox sump 372, the at least one gear being at least partially submerse in the coolant 380 during operation of the electric motor 302. For example, and as shown, the at least one gear may be the gear 362 fixedly coupled to the housing 357 of the differential 356. Upon rotation of the plurality of gears, the coolant 380 may be supplied from the gearbox sump 372 to the shaft sump 370. Specifically, the gear 362 may splash the coolant 380 directly into the shaft sump 370 (as indicated by arrows 384 and 386) or indirectly via first splashing the coolant 380 against an inner or internal surface 354a (e.g., of the housing 354) of the gearbox 352 opposite to the gearbox sump 372 (e.g., following the arrows 384), wherefrom the splashed coolant 380 may flow into the shaft sump 370 (e.g., following the arrow 386). In certain examples, the shaft sump 370 may only receive the coolant 380 via the splashing of the coolant 380, e.g., directly into the shaft sump 370, first against the inner surface 354a of the gearbox 352 and then to the shaft sump 370, or both.

In some examples, one or more baffles or vanes 358 may be disposed on and affixed to the inner surface 354a of the gearbox 352 opposite to the gearbox sump 372, the one or more baffles 358 configured to receive the splashed coolant 380 from rotation of the plurality of gears and direct the received coolant 380 to the shaft sump 370. Any configuration of the one or more baffles 358 which may direct the splashed coolant 380 to the shaft sump 370 may be considered within the scope of the present disclosure. For example, varying configurations of the one or more baffles 358 may include an overall shape of each of the one or more baffles 358, a number of the one or more baffles 358, and an angle of the one or more baffles 358 with respect to the inner surface 354a of the gearbox 352. In this way, the passive cooling system 300 may cool the electric motor 302 during operation thereof via passively cycling of the coolant 380 through the gearbox 352.

Referring now to FIG. 4, a flow chart depicting a method 400 for passively cooling an electric motor fluidically coupled to a gearbox is shown. Specifically, the electric motor may be cooled by passively cycling a coolant along a flow path extending through each of the electric motor and the gearbox. In some examples, the gearbox may be similar to, or the same as, the second gearbox 121 as described in detail above with reference to FIG. 1 or the gearbox 352 as described in detail above with reference to FIG. 3. Similarly, in some examples, the electric motor may be similar to, or the same as, the electric motor 120 or the electric motor 152 as described in detail above with reference to FIG. 1, the electric motor 200 as described in detail above with reference to FIG. 2, or the electric motor 302 as described in detail above with reference to FIG. 3. In examples wherein the electric motor is the electric motor 302 and the gearbox is the gearbox 352, method 400 may be physically carried out via various components of the passive cooling system 300. Accordingly, in some examples, the various components employed to execute method 400 as described below may be similarly named to and the same as the various components of the passive cooling system 300, respectively.

Further, at least some steps (e.g., 402, 404, 414) of method 400 may be implemented as executable instructions in non-transitory memory of a vehicle controller (e.g., the controller 150 of FIG. 1). For example, the instructions may be executed by the vehicle controller according to the at least some steps of method 400 in conjunction with signals received from sensors or requests received from an operator of a vehicle (e.g., the vehicle 100 of FIG. 1) including the vehicle controller. Further, the vehicle controller may employ actuators of the vehicle to adjust vehicle operation according to the at least some steps of method 400. The instructions for carrying out the at least some steps of method 400 and commands to the actuators may be executed automatically by the vehicle controller (following an operator command and/or under preset conditions).

At 402, method 400 may include receiving a vehicle startup request. For example, an operator of the vehicle may generate the vehicle startup request via actuation at the vehicle (e.g., by turning a key, depressing a mechanical button, actuating light, movement, and/or weight sensors, etc.) while the vehicle speed is zero. Additionally or alternatively, the vehicle startup request may be received autonomously (e.g., without operator input). Responsive to receiving the vehicle startup request, the vehicle may startup and operation of the electric motor may commence.

At 404, method 400 may include rotating a second shaft (e.g., the inner shaft 330 of FIG. 3) via operation of the electric motor. Specifically, the second shaft may extend through the electric motor, the second shaft being coaxial with and extending through a first shaft (e.g., the outer shaft 320 of FIG. 3). The first shaft may fluidically couple a first sump (e.g., the shaft sump 370 of FIG. 3) of the gearbox with the electric motor, the first sump configured to contain a coolant.

At 406, method 400 may include delivering the coolant from a second sump (e.g., the gearbox sump 372 of FIG. 3) of the gearbox to the first sump via splashing of the coolant directly into the first sump or indirectly via first splashing the coolant against a housing of the gearbox followed by flowing the coolant therefrom into the first sump. Specifically, at least one gear (e.g., the gear 362 of FIG. 3) fixedly coupled to the second shaft may extend into the second sump, such that the at least one gear may splash the coolant towards a portion of the housing of the gearbox opposite to the second sump during rotation of the second shaft, at least some of the coolant being splashed directly into the first sump in some examples and at least some of the coolant first splashing against the portion of the housing of the gearbox and flowing therefrom into the first sump in additional or alternative examples. In some examples, one or more baffles may be affixed to the portion of the housing of the gearbox opposite to the second sump, the one or more baffles configured to receive and flow the splashed coolant into the first sump. In certain examples, the first sump may only receive the coolant via the splashing of the coolant, e.g., directly into the first sump, first against the housing of the gearbox and then into the first sump, or both.

At 408, method 400 may include delivering the coolant from the first sump to the electric motor via rotation of one or more surface features affixed to the second shaft. Specifically, the one or more surface features, being affixed to the second shaft and, in some examples, being clearance fit to an inner surface of the first shaft, may be rotated concurrently with the second shaft. Further, the one or more surface features may be configured (e.g., as an external helical threading, a propeller, etc.) such that the coolant may be drawn through the first shaft via rotation of the second shaft therewithin. In certain examples, the coolant may only be drawn through the first shaft from the first sump to the electric motor via rotation of the second shaft. In this way, the first and second shafts may be configured as a passive coolant pump during operation of the electric motor.

At 410, method 400 may include delivering the coolant from the electric motor to the second sump via gravity drainage. Specifically, the coolant may be collected in one or more channels set into an inner surface of the electric motor, wherefrom the coolant may gravity drain into the second sump through an opening fluidically coupling the electric motor to the second sump.

At 412, method 400 may include determining whether an electric motor shutdown request has been received. For example, an operator of the vehicle may generate the electric motor shutdown request via actuation at the vehicle (e.g., by turning a key, depressing a mechanical button, actuating light, movement, and/or weight sensors, etc.) while the vehicle speed is zero. Additionally or alternatively, the electric motor shutdown request may be received autonomously (e.g., without operator input). In some examples, the electric motor shutdown request may be accompanied by a vehicle shutdown request. In other examples, the electric motor shutdown request may be accompanied by an engine startup request. If the electric motor shutdown request has not been received, method 400 may proceed to 414, where method 400 may include to continue operation of the electric motor. Method 400 may return to 404 and the coolant may continue to be passively cycled through the electric motor and the gearbox.

If the electric motor shutdown request has been received, method 400 may proceed to 416, where method 400 may include shutting down the electric motor and passive cycling of the coolant may cease. In examples wherein the electric motor shutdown request is accompanied by the vehicle shutdown request, shutting down the electric motor may be executed in tandem with shutting down the vehicle. In examples wherein the electric motor shutdown request is accompanied by the engine startup request, shutting down the electric motor may be executed in tandem with starting up an engine (e.g., the engine 110 of FIG. 1) of the vehicle.

In this way, systems and methods are provided for passively cycling and distributing a coolant throughout an electric motor fluidically coupled to a gearbox. In an exemplary embodiment, an inner shaft at least partially housed within an outer shaft may extend through each of the electric motor and a shaft sump of the gearbox, the shaft sump being substantially continuously supplied with the coolant during a given operation of the electric motor. The outer shaft may fluidically couple the electric motor to the shaft sump such that a flow path for the coolant may be provided. Upon rotation of the inner shaft during the given operation of the electric motor, one or more surface features extending therefrom (e.g., clearance fit to an internal surface of the outer shaft) may draw the coolant along the flow path from the shaft sump to the electric motor. A plurality of openings or outlets in a portion of the outer shaft housed within the electric motor may extend the flow path into an interior of the electric motor. In some examples, the plurality of openings or outlets may be positioned based on a desired configuration or application of the electric motor. In one example, the plurality of openings or outlets may be positioned to direct the coolant to specific surfaces within the interior of the electric motor or to distribute the coolant substantially evenly throughout the interior of the electric motor.

The coolant within the interior of the electric motor may be collected in one or more channels or grooves set into internal surfaces of the electric motor and fluidically coupled to a gearbox sump integrally formed within the gearbox, such that the one or more channels or grooves may extend the flow path of the coolant to the gearbox sump (e.g., via gravity drainage of the collected coolant). The gearbox may further include a gear extending into the gearbox sump, whereby the gear may be at least partially submerged in the coolant delivered to the gearbox sump via the one or more channels or grooves. The gear may be fixedly coupled to the inner shaft, such that the gear may splash the coolant from the gearbox sump against an internal surface of the gearbox upon rotation of the inner shaft during the given operation of the electric motor. The splashed coolant, guided by one or more baffles or vanes extending from the internal surface of the gearbox in some examples, may flow from the internal surface of the gearbox back into the shaft sump (e.g., continuously supplying the shaft sump with the coolant during the given operation of the electric motor). Thus, the flow path may be extended from the gearbox sump to the shaft sump, wherefrom the coolant may again be directed to the electric motor along the outer shaft.

A technical effect of configuring the flow path in this way is that the coolant may be sufficiently distributed throughout the electric motor via passive cycling of the coolant through the gearbox. Accordingly, a complexity and a cost of cooling the electric motor may not be significantly increased, contrary to examples wherein coolant flow is induced via active pumping. Such advantages of such passive cycling may not be readily apparent, as a reverse operation of the electric motor may result in the coolant being siphoned away from the electric motor (as rotation of the inner shaft may be reversed during the reverse operation). However, as performance may be limited for many applications during such reverse operation, less excess heat may be generated, and cooling operations may concomitantly be reduced with minimal practical consequence. Further, in some examples, an auxiliary cooling system such as a cooling jacket may be provided to supplant or supplement the passive cycling during such reverse operation (and/or to augment the passive cycling during forward operation, thereby further improving continuous performance).

FIGS. 2 and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example, a system, comprising: a gearbox comprising a first sump; an electric motor fluidically coupled to the gearbox; an outer shaft extending through the electric motor and into the first sump, the first sump being fluidically coupled to the electric motor via the outer shaft; an inner shaft coaxial with the outer shaft, the inner shaft extending through each of the first sump and the outer shaft; and an external screw thread disposed along a portion of the inner shaft extending within the outer shaft. A first example of the system further includes wherein a coolant is included in the first sump, and whereupon rotation of the inner shaft, the coolant is drawn through the outer shaft from the first sump into the electric motor. A second example of the system, optionally including the first example of the system, further includes wherein the gearbox further comprises a second sump and a plurality of gears, at least one of the plurality of gears extending into the second sump, and wherein rotation of the plurality of gears supplies the coolant from the second sump to the first sump. A third example of the system, optionally including one or more of the first and second examples of the system, further includes wherein the rotation of the plurality of gears is coupled to the rotation of the inner shaft. A fourth example of the system, optionally including one or more of the first through third examples of the system, further comprises one or more baffles disposed on an inner surface of the gearbox, the one or more baffles configured to receive the coolant from the rotation of the plurality of gears and direct the received coolant to the first sump. A fifth example of the system, optionally including one or more of the first through fourth examples of the system, further includes wherein the electric motor is fluidically coupled to the second sump, and wherein, after the coolant is drawn into the electric motor, the coolant collects on an inner surface of the electric motor and drains into the second sump via one or more channels set in the inner surface of the electric motor. A sixth example of the system, optionally including one or more of the first through fifth examples of the system, further includes wherein the first sump is not sealed where each of the outer shaft and the inner shaft extends therethrough.

In another example, an electric motor, comprising: a housing enclosing each of a stator and a rotor; a first shaft fixedly coupled to the rotor, the first shaft at least partially enclosed within the housing and fluidly coupled to a coolant sump external to the housing; and a second shaft extending through each of the first shaft and the coolant sump, a threading pattern helically extending from the second shaft, whereupon rotation of the second shaft, the threading pattern draws coolant from the coolant sump into the housing, the coolant only being drawn into the housing via rotation of the second shaft. A first example of the electric motor further includes wherein a plurality of openings is disposed on a portion of the first shaft enclosed within the housing, and whereupon the rotation of the second shaft, the coolant enters the housing via the plurality of openings. A second example of the electric motor, optionally including the first example of the electric motor, further includes wherein at least some openings of the plurality of openings are axially positioned beneath respective end windings of the stator. A third example of the electric motor, optionally including one or more of the first and second examples of the electric motor, further comprises a cooling jacket arranged between the housing and the stator. A fourth example of the electric motor, optionally including one or more of the first through third examples of the electric motor, further includes wherein the electric motor includes no cooling jacket therein.

In yet another example, a method, comprising: rotating an inner shaft relative to an outer shaft via operation of an electric motor, the inner shaft coaxial with and extending through the outer shaft; delivering a coolant from a gearbox sump to a shaft sump via splashing of the coolant during rotation of the inner shaft; delivering the coolant from the shaft sump to an internal volume of the electric motor via rotation of one or more surface features affixed to the inner shaft; and delivering the coolant from the internal volume of the electric motor to the gearbox sump via gravity drainage. A first example of the method further includes wherein the shaft sump only receives the coolant via the splashing of the coolant. A second example of the method, optionally including the first example of the method, further includes wherein a gear is fixedly coupled to the inner shaft and extends into the gearbox sump, and wherein the splashing of the coolant comprises the gear splashing the coolant directly into the first sump. A third example of the method, optionally including one or more of the first and second examples of the method, further includes wherein a gear is fixedly coupled to the inner shaft and extends into the gearbox sump, and wherein the splashing of the coolant comprises the gear splashing the coolant against a portion of a gearbox housing including one or more baffles affixed thereto, the one or more baffles configured to flow the splashed coolant into the shaft sump. A fourth example of the method, optionally including one or more of the first through third examples of the method, further includes wherein the gearbox sump is integrally formed in the gearbox housing opposite to the one or more baffles. A fifth example of the method, optionally including one or more of the first through fourth examples of the method, further includes wherein the delivery of the coolant from the shaft sump to the internal volume of the electric motor comprises inducing flow of the coolant along the outer shaft only based on the rotation of the inner shaft. A sixth example of the method, optionally including one or more of the first through fifth examples of the method, further includes wherein the one or more surface features is configured as an external helical threading. A seventh example of the method, optionally including one or more of the first through sixth examples of the method, further includes wherein the one or more surface features is configured as a propeller.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A system, comprising:
a gearbox comprising a gearbox sump;
an electric motor fluidically coupled to the gearbox;
a rotor shaft extending axially outward from the electric motor and into the gearbox sump;
an inner shaft coaxial with the rotor shaft, wherein the inner shaft axially extends through the rotor shaft and into the gearbox sump;
a shaft sump positioned with a gearbox housing and directly surrounding the inner shaft; and
an external screw thread that extends along a portion of the inner shaft extending within the rotor shaft;
wherein the inner shaft extends through the shaft sump and is directly rotationally coupled to and arranged coaxial with a differential;
wherein the external screw thread is arranged on a section of the inner shaft that is submerged in the shaft sump;

wherein the shaft sump receives coolant that is splashed via one or more gears in the gearbox; and wherein rotation of the inner shaft induced by the differential generates coolant flow from the shaft sump into the electric motor.

2. The system of claim 1, wherein the shaft sump is positioned axially between a ring gear of the differential and a gear that is directly coupled to the rotor shaft.

3. The system of claim 2, wherein the gearbox housing is directly coupled to an electric machine housing.

4. The system of claim 3, wherein the electric motor is fluidically coupled to the gearbox sump, and wherein, after the coolant is drawn into the electric motor, the coolant collects on an inner surface of the electric motor and drains into the gearbox sump via one or more channels set in the inner surface of the electric motor.

5. The system of claim 1, wherein the one or more gears are included in a plurality of gears and one of the plurality of gears is rotationally coupled to the differential.

6. The system of claim 5, further comprising one or more baffles disposed on an inner surface of the gearbox, the one or more baffles configured to receive the coolant from the rotation of the plurality of gears and direct the received coolant to the gearbox sump.

7. The system of claim 1, wherein the gearbox sump is not sealed where each of the rotor shaft and the inner shaft extends therethrough.

8. The system of claim 1, further comprising a controller including instructions that when executed cause the system to: rotate the rotor shaft via operation of the electric motor; wherein rotation of the rotor shaft rotates a plurality of gears in the gearbox that are rotationally coupled to the differential; and wherein the plurality of gears include the one or more gears.

9. The system of claim 1, wherein the electric motor includes a coolant jacket.

10. The system of claim 1, wherein the system is an electric vehicle system.

11. The system of claim 1, wherein the external screw thread has a helical profile.

12. An electric motor, comprising:

a housing enclosing each of a stator and a rotor;

a rotor shaft fixedly coupled to the rotor, the rotor shaft at least partially enclosed within the housing and fluidly coupled to a shaft sump external to the housing;

an inner shaft extending through each of the rotor shaft and into the coolant sump; and an external screw thread that extends along a portion of the inner shaft extending within the rotor shaft;

wherein the inner shaft extends through the shaft sump and is directly rotationally coupled to and arranged coaxial with a differential;

wherein the external screw thread is arranged on a section of the inner shaft that is submerged in the shaft sump;

wherein the shaft sump is positioned with a gearbox housing and directly surrounds the inner shaft;

wherein the shaft sump receives coolant that is splashed via one or more gears in the gearbox;

wherein rotation of the inner shaft generates coolant flow from the shaft sump into the electric motor; and wherein rotation of the inner shaft with the external screw thread generates coolant flow from the shaft sump into the housing, and wherein the coolant solely flows into the housing via rotation of the inner shaft.

13. The electric motor of claim 12, wherein a plurality of openings are disposed on a portion of the rotor shaft enclosed within the housing, and wherein rotation of the inner shaft generates coolant flow into the housing via the plurality of openings.

14. The electric motor of claim 13, wherein at least some openings of the plurality of openings are axially positioned beneath respective end windings of the stator.

15. The electric motor of claim 12, further comprising a cooling jacket arranged between the housing and the stator.

16. The electric motor of claim 12, wherein the electric motor includes no cooling jacket therein.

17. The system of claim 12, wherein the shaft sump is positioned axially between a ring gear of the differential and a gear that is directly coupled to the rotor shaft.

\* \* \* \* \*